United States Patent
Dormody et al.

(10) Patent No.: US 12,270,967 B2
(45) Date of Patent: Apr. 8, 2025

(54) FIELD CALIBRATION OF REFERENCE WEATHER STATIONS

(71) Applicant: NextNav, LLC, Sunnyvale, CA (US)

(72) Inventors: Michael Dormody, San Jose, CA (US); Guiyuan Han, San Jose, CA (US); Badrinath Nagarajan, Cupertino, CA (US); Wei Liu, San Jose, CA (US); Prashant Dave, Rajasthan (IN); Arun Raghupathy, Bangalore (IN)

(73) Assignee: NextNav, LLC, Sunnyvale, CA (US)

( * ) Notice: Subject to any disclaimer, the term of this patent is extended or adjusted under 35 U.S.C. 154(b) by 225 days.

(21) Appl. No.: 18/053,254

(22) Filed: Nov. 7, 2022

(65) Prior Publication Data

US 2023/0152489 A1 May 18, 2023

Related U.S. Application Data

(60) Provisional application No. 63/264,119, filed on Nov. 16, 2021.

(51) Int. Cl.
  *G01W 1/18* (2006.01)
  *G01W 1/02* (2006.01)
  (Continued)

(52) U.S. Cl.
  CPC ............ *G01W 1/18* (2013.01); *G01W 1/02* (2013.01); *G01L 27/002* (2013.01); *G01W 1/10* (2013.01)

(58) Field of Classification Search
  CPC ........... G01W 1/18; G01W 1/02; G01W 1/10; G01L 27/002
  See application file for complete search history.

(56) References Cited

U.S. PATENT DOCUMENTS

| 10,921,121 B2 | 2/2021 | Dormody et al. |
| 2007/0266783 A1* | 11/2007 | Saporito ................. G01C 5/06 73/384 |

(Continued)

FOREIGN PATENT DOCUMENTS

JP 2013054005 A * 3/2013

OTHER PUBLICATIONS

Wikipedia ('Pressure gradient', Wikipedia, The Free Encyclopedia, Sep. 27, 2021, 05:21 UTC) (Year: 2021).*

(Continued)

*Primary Examiner* — Lisa M Caputo
*Assistant Examiner* — Christian T Bryant
(74) *Attorney, Agent, or Firm* — MLO, a professional corp.

(57) ABSTRACT

Field calibration of a pressure device involves collecting simultaneous pressure data or pressure and temperature data at two devices for multiple time points. Pressure differences between pairs of simultaneous data points of the collected pressure data are calculated. A model is fitted to the pressure differences and the temperatures and/or pressures, and model parameters are used to correct measurements from the second device. Alternatively, a pressure gradient is estimated for a region that encompasses the two devices for each time point. A distance is determined between the two devices. A pressure gradient difference is determined between the two devices for each time point. A pressure difference offset is obtained for one of the pairs of simultaneous data points for each time point. An average pressure difference offset is determined between the two devices and is used to correct measurements from one of the devices.

3 Claims, 6 Drawing Sheets

(51) Int. Cl.
  *G01W 1/10* (2006.01)
  *G01L 27/00* (2006.01)

(56) References Cited

U.S. PATENT DOCUMENTS

| | | | |
|---|---|---|---|
| 2012/0265373 A1* | 10/2012 | Ingvalson | G01C 5/06 |
| | | | 701/4 |
| 2015/0127287 A1 | 5/2015 | Wolf et al. | |
| 2017/0023430 A1 | 1/2017 | Dormody et al. | |
| 2019/0368873 A1* | 12/2019 | Dormody | G01C 5/06 |

OTHER PUBLICATIONS

Azevedo et al. ("Weather stations-assisted barometric altimeter for Android: Interpolation techniques for improved accuracy," 2016 IEEE Sensors Applications Symposium (SAS), Catania, Italy, 2016, pp. 1-6, doi: 10.1109/SAS.2016.7479890) (Year: 2016).*
International Search Report and Written Opinion dated Feb. 7, 2023 for PCT Patent Application No. PCT/IB2022/060707.

* cited by examiner

FIELD CALIBRATION OF REFERENCE WEATHER STATIONS

RELATED APPLICATIONS

This application claims priority to U.S. Provisional Patent Application No. 63/264,119, filed on Nov. 16, 2021, and entitled, "Field Calibration of Reference Weather Stations", all of which is hereby incorporated by reference in its entirety and for all purposes.

BACKGROUND

Some types of mobile devices, such as smart phones, include a barometric pressure sensor. Barometric pressure measurements generated by the barometric pressure sensor can be used to estimate the altitude of the mobile device. In order to provide accurate pressure measurements for accurate altitude estimations, the barometric pressure sensor must be properly calibrated. When estimating the altitude of the mobile device or calibrating the barometric pressure sensor therein, the pressure measurement is compared to a reference pressure based on a pressure measurement generated by a reference pressure device or sensor. Multiple reference pressure devices in a network of horizontally and vertically spatially separated reference weather stations can be used for this purpose. Such a barometric-based altitude estimation system relies on accurate weather information, so the reference pressure devices must also be properly calibrated.

High-quality reference pressure devices (known as "golden" pressure sensors) can reliably provide accurate pressure measurements. These devices are accurately calibrated before being deployed across the network of reference weather stations (e.g., in a laboratory or manufacturing facility) and are known to maintain their calibration for a long time. However, these devices are generally expensive and slower to manufacture reliably, so it is financially impractical to use these high-quality reference pressure devices for all of the reference pressure devices in the network of reference weather stations.

Due to the high cost and scarcity of the high-quality reference pressure devices, some of the reference pressure devices in the network of reference weather stations are lower-cost, less reliable pressure devices. Although these less reliable pressure devices can often be calibrated before deployment in the network of reference weather stations (e.g., in a laboratory or manufacturing facility), they can be prone to inaccuracy, because their calibration tends to "drift" over a relatively short time (e.g., on the order of days). Thus, these less reliable pressure devices (known as "drifty" pressure sensors) must be recalibrated using one of the high-quality reference pressure devices, which is centrally located among several of the less reliable pressure devices. Calibration of the less reliable pressure devices causes the sensor measurements therefrom to be adjusted to agree with an average measurement from the high-quality reference pressure device, since the long-term average (e.g., on the order of days or weeks) of pressure differences of two spatially separated locations will tend to equalize over a given timeframe.

This approach reduces the need to retrieve the less reliable pressure devices for routine recalibration in a laboratory setting, and thus allows for calibration of deployed units in the field. However, this approach can be limited, for example, if the less reliable pressure device has a significant temperature dependence (i.e., the calibration value changes depending on ambient temperature), if the less reliable pressure device was not calibrated over the range of temperatures experienced in the field, if the less reliable pressure device was not calibrated at all, or if the temperature dependence has drifted over time. In these cases, a one-point calibration at an average temperature is insufficient. In addition, if the less reliable pressure device is located somewhere with a significant, sustained pressure gradient compared with the high-quality reference pressure device, then the calibration may contain a bias not reflective of the true ambient pressure in the direct vicinity of the less reliable pressure device, causing a miscalibration of the less reliable pressure device.

SUMMARY

In some embodiments, a method includes: collecting simultaneous pressure data and temperature data measured at a first reference weather station and a second reference weather station for multiple time points, wherein the first reference weather station and the second reference weather station have been deployed in an operational environment, and the first reference weather station has a higher reliability and is less prone to sensor drift relative to the second reference weather station; calculating pressure differences between pairs of simultaneous data points of the collected pressure data; fitting a model to the pressure differences versus corresponding temperatures and/or pressures; and using fit parameters of the model to correct measurements from the second reference weather station.

In some embodiments, a method includes: collecting simultaneous pressure data measured at a first reference weather station and a second reference weather station for multiple time points, wherein the first reference weather station and the second reference weather station have been deployed in an operational environment, and the first reference weather station has a higher reliability and is less prone to sensor drift relative to the second reference weather station; calculating pressure differences between pairs of simultaneous data points of the collected pressure data; fitting a model to the pressure differences versus corresponding pressures; and using fit parameters of the model to correct measurements from the second reference weather station.

In some embodiments, the collected pressure data for the first reference weather station and the second reference weather station is translated to a common altitude. In some embodiments, the model is fitted with temperatures or pressures as inputs and pressure differences as outputs, and the model approximates the pressure differences when given the temperatures or pressures. In some embodiments, the temperatures or pressures that are input to the model are measured by the second reference weather station at the multiple time points. In some embodiments, the temperatures or pressures that are input to the model are measured by the first reference weather station at the multiple time points. In some embodiments, the temperatures or pressures that are input to the model are a weighted combination of temperatures or pressures measured by the first reference weather station at the multiple time points and temperatures or pressures measured by the second reference weather station at the multiple time points.

In some embodiments, a method includes: collecting simultaneous pressure data at a first reference weather station and a second reference weather station for multiple time points, wherein the first reference weather station and the second reference weather station have been deployed in an operational environment, and the first reference weather station has a higher reliability and is less prone to sensor drift relative to the second reference weather station; calculating pressure differences between pairs of simultaneous data points of the collected pressure data; for each time point, estimating a pressure gradient for a region that encompasses the first reference weather station and the second reference weather station; determining a distance between the first reference weather station and the second reference weather station; for each time point, determining a pressure gradient difference between the first reference weather station and the second reference weather station based on the pressure gradient and the distance between the first reference weather station and the second reference weather station; for each time point, obtaining a pressure difference offset for one of the data points of the pair of simultaneous data points based on the pressure gradient difference and the pressure difference; determining an average pressure difference offset between the first reference weather station and the second reference weather station by averaging the pressure difference offsets for the pairs of simultaneous data points; and using the average pressure difference offset to correct measurements from the second reference weather station.

In some embodiments, determining the pressure gradient difference between the first reference weather station and the second reference weather station further includes: multiplying the pressure gradient by the distance between the first reference weather station and the second reference weather station. In some embodiments, obtaining the pressure difference offset for one of the data points of the pair of simultaneous data points further includes: subtracting the pressure gradient difference from the pressure difference.

DETAILED DESCRIPTION

Improved methods to calibrate reference pressure devices that have been deployed in the field (as opposed to in a laboratory or manufacturing facility) are disclosed herein: calibrating across temperatures, pressures and pressure gradients. These methods can be combined and performed in any order, or just one can be performed independently. Thus, the disclosed methods improve calibration of pressure devices or sensors in a network of reference weather stations by incorporating sensor sensitivity to temperature changes, pressure changes, and physical pressure gradients.

United States Patent Application Publication No. 2015/0127287 discloses calibration of a pressure sensor of a reference weather station, is assigned in common with the present application, and is incorporated herein by reference as if fully set forth herein.

Figure 1:
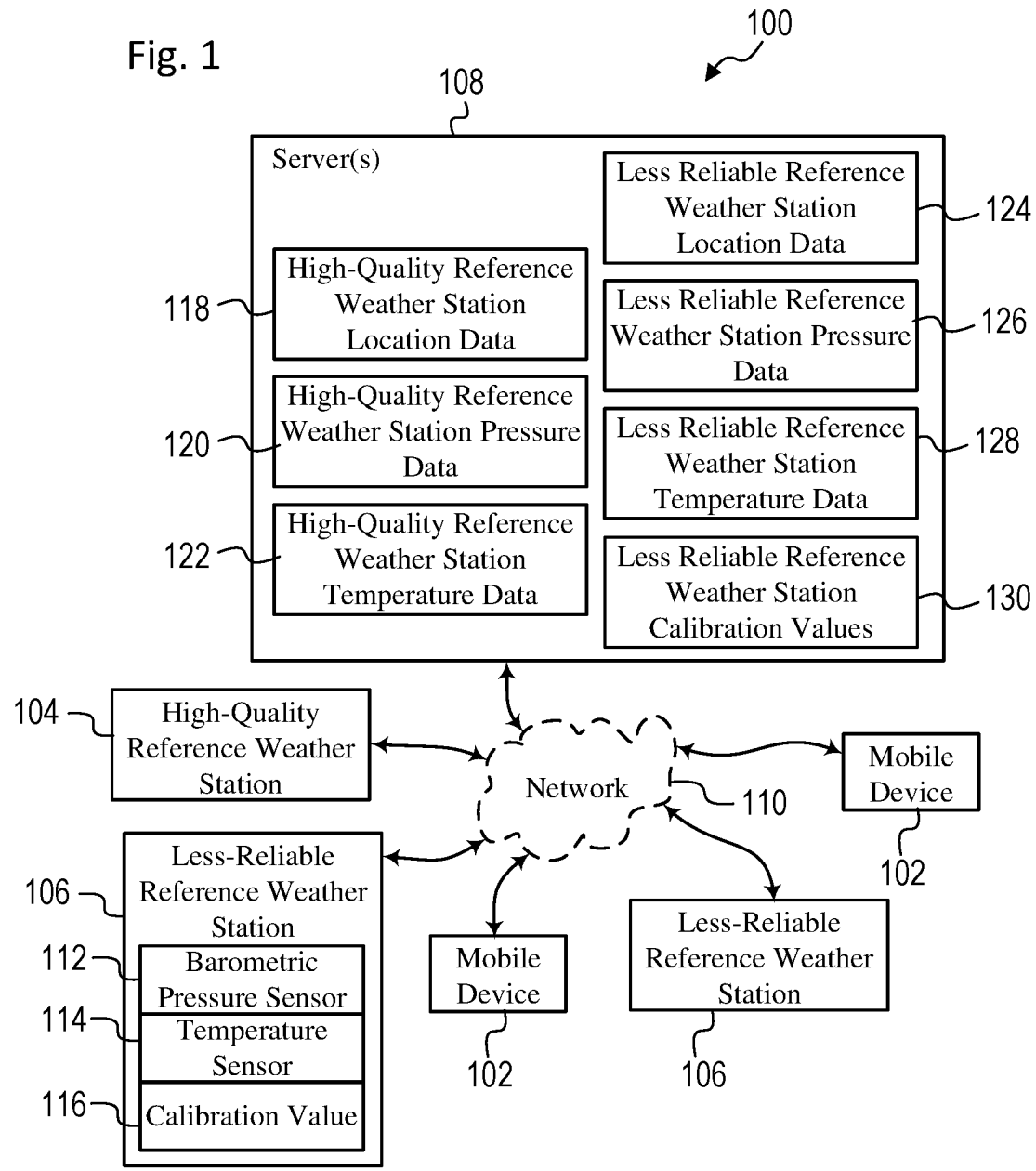
FIG. 1 is a simplified schematic diagram of an example system for determining a location of a mobile device, in accordance with some embodiments.

FIG. 1 shows an example location system 100 for determining the location of mobile devices 102, in accordance with some embodiments. The example location system 100 generally includes the mobile devices 102, one or more high-quality or golden reference weather station 104, one or more less reliable or drifty reference weather station 106, and one or more server 108, among other components not shown for simplicity. The mobile devices 102, the high-quality "first" reference weather station 104, the less reliable "second" reference weather station 106, and the server 108 generally communicate through a network 110.

The server 108 generally represents one or more computerized devices, such as a cloud computing system, a server farm, a set of computers, a desktop computer, a notebook computer, among others. The functions described herein of the server 108, thus, may be performed by one or more physical server or computerized devices. The mobile devices 102 each generally represent a mobile phone, smart phone, a cell phone, other wireless communication device, a handheld computer, a notebook computer, a personal computer, a portable computer, a navigation device, a tracking device, a receiver, a wearable computing device, a game console, etc. The network 110 generally represents any appropriate combination of one or more communication systems, such as the Internet, cell phone communication systems, broadband cellular networks, wide area networks (WANs), local area networks (LANs), wireless networks, networks based on the IEEE 802.11 family of standards (Wi-Fi networks), and other data communication networks.

In some embodiments, each mobile device 102 generally includes a position sensor, a movement sensor, a barometric pressure sensor, and a device calibration value, among other hardware, software and data (not shown). In some embodiments, with the device sensor data from its sensors, its device calibration value, and the reference data (e.g., temperature and pressure) from the reference weather stations 104/106, the mobile device 102 determines its location, including horizontal position and altitude. In some embodiments, the server 108 maintains or receives this data, determines the location of the mobile device 102, and sends the location data to the mobile device 102.

In some embodiments, each less reliable reference weather station 106 generally includes a barometric pressure sensor 112, a temperature sensor 114, and a calibration value 116, among other components and data not shown for simplicity. Each high-quality reference weather station 104 generally includes similar components and data. However, the high-quality reference weather stations 104 have pressure sensors with a much higher reliability and are less prone to sensor drift relative to pressure sensors of the less reliable reference weather stations 106, because the high-quality reference weather stations 104 have more expensive "golden" pressure sensors that typically have a drift of less than 10 Pa/year, and the less reliable reference weather stations 106 have lower-cost "drifty" pressure sensors that typically have a drift of less than 100 Pa/year and sometimes about 10 Pa/week in either +/− direction.

In some embodiments, the server 108 generally maintains, receives, or calculates location data 118 for the high-quality reference weather stations 104, pressure data 120 for the high-quality reference weather stations 104, temperature data 122 for the high-quality reference weather stations 104, location data 124 for the less reliable reference weather stations 106, pressure data 126 for the less reliable reference weather stations 106, temperature data 128 for the less reliable reference weather stations 106, and calibration values 130 (or the "model fit parameters" or the "average pressure difference offset" described below) for the less reliable reference weather stations 106. The server 108 communicates with the reference weather stations 104 and 106 to receive the portion of this data that is generated by the reference weather stations 104 and 106, e.g., the temperature and pressure data. The server 108 uses this data for calibrating the barometric pressure sensors 112 of the less reliable reference weather stations 106, i.e., to generate/calculate the calibration values 130 for the less reliable reference weather stations 106, e.g., using a best fit model of pressure difference versus temperature/pressure or using pressure gradients as described below.

In some embodiments, the server 108 sends the calibration values 130 to each less reliable reference weather station 106 for the less reliable reference weather station 106 to adjust its pressure data before transmitting it (e.g., either to the server 108 or to the mobile devices 102) for use in determining the locations of the mobile devices 102. In some embodiments, the server 108 maintains the calibration values 130 for each less reliable reference weather station 106, receives the pressure data from the less reliable reference weather station 106, and adjusts the pressure data (based on the calibration values 130) for use in determining the locations of the mobile devices 102 (e.g., either by the server 108 or by the mobile devices 102).

Figure 2:
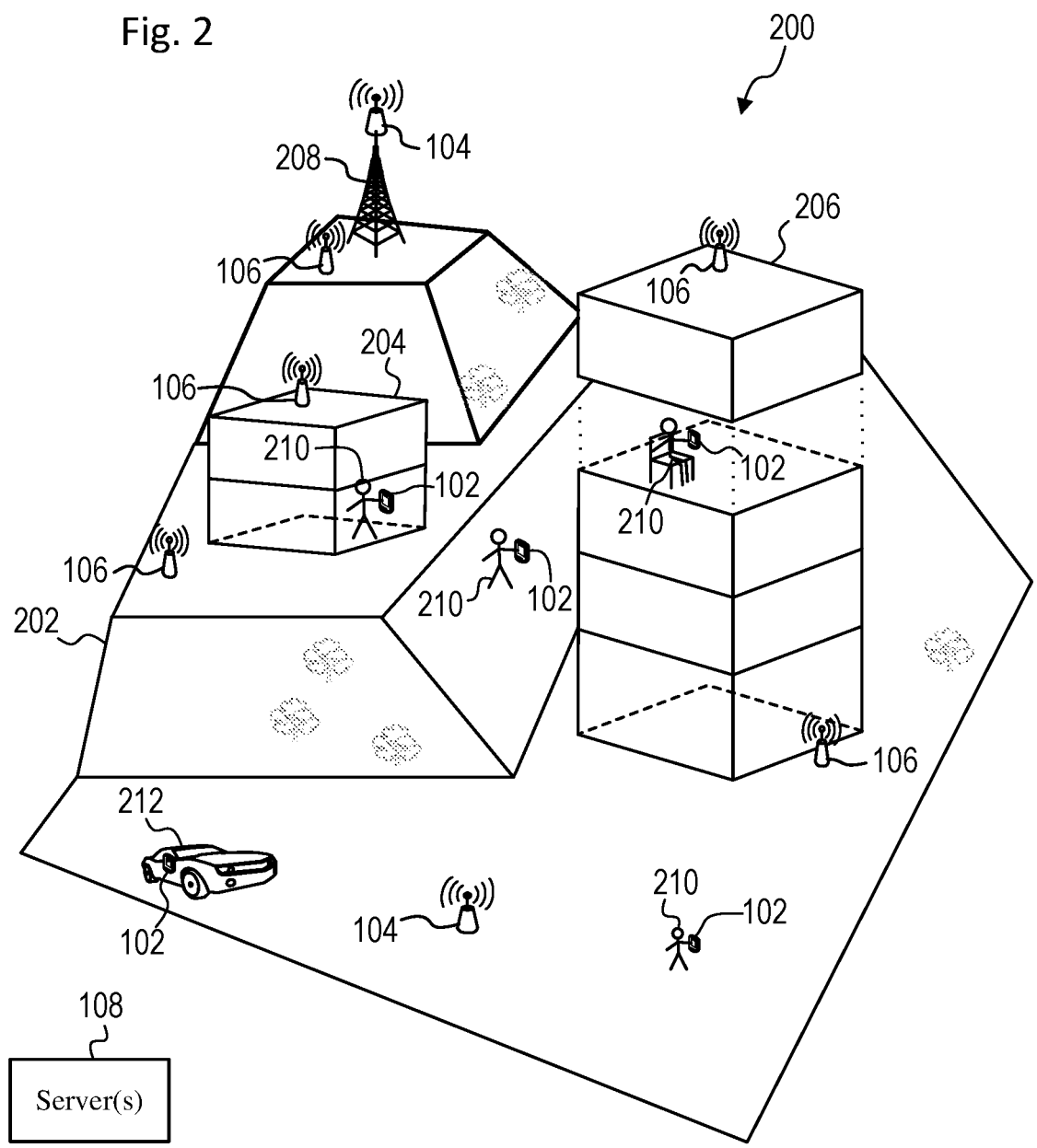
FIG. 2 is a simplified environment in which a reference pressure device can be calibrated, in accordance with some embodiments.

FIG. 2 is a simplified operational environment 200 in which reference pressure devices (e.g., the less reliable reference weather stations 106) can be calibrated (e.g., using measurements from the high-quality reference weather stations 104) in the field, in accordance with some embodiments. The operational environment 200 includes an example of the network of reference weather stations 104 and 106, examples of the mobile devices 102, and the server(s) 108. The server 108 exchanges communications with various devices, such as the reference weather stations 104 and 106 and the mobile devices 102. (The mobile devices 102, however, are not necessarily used in the calibration of the less reliable reference weather stations 106, so they are shown in the operational environment 200 for illustrative purposes only, since the overall purpose of the location system 100 is to determine the locations of the mobile devices 102.) Also, the example operational environment 200 includes a terrain 202 having ground levels at different elevations (altitudes) and structures, such as buildings 204 and 206 having floor levels at different altitudes and a transmission tower 208.

The reference weather stations 104 and 106 form a network of terrestrial transmitters that may be located at different altitudes or depths that are inside or outside various natural or manmade structures (e.g., the buildings 204 and 206 and the transmission tower 208), relative to different altitudes throughout the terrain 202, as illustrated by the examples in FIG. 2. In some embodiments, sensor measurements (e.g., temperature and pressure) and positioning signals are transmitted from the reference weather stations 104 and 106 and subsequently received by the mobile device 102 and/or the server 108 using known transmission technologies. Positioning signals may also be transmitted from transmitters (that are not weather stations, e.g., the transmission tower 208) located throughout the example operational environment 200 or from satellites (not shown) high above the example operational environment 200. For example, the sensor measurements and positioning signals may be transmitted using one or more common multiplexing parameters that utilize time slots, pseudorandom sequences, frequency offsets, or other approaches, as is known in the art or otherwise disclosed herein.

The mobile devices 102 may be carried by users 210 located at different altitudes or depths that are inside or outside various natural or manmade structures (e.g., the buildings 204 and 206), relative to different altitudes throughout the terrain 202, as illustrated by the examples in FIG. 2. The mobile devices 102 may also be carried or mounted in a vehicle 212 within the operational environment 200 or an aircraft (not shown) high above the operational environment 200.

Figure 8:
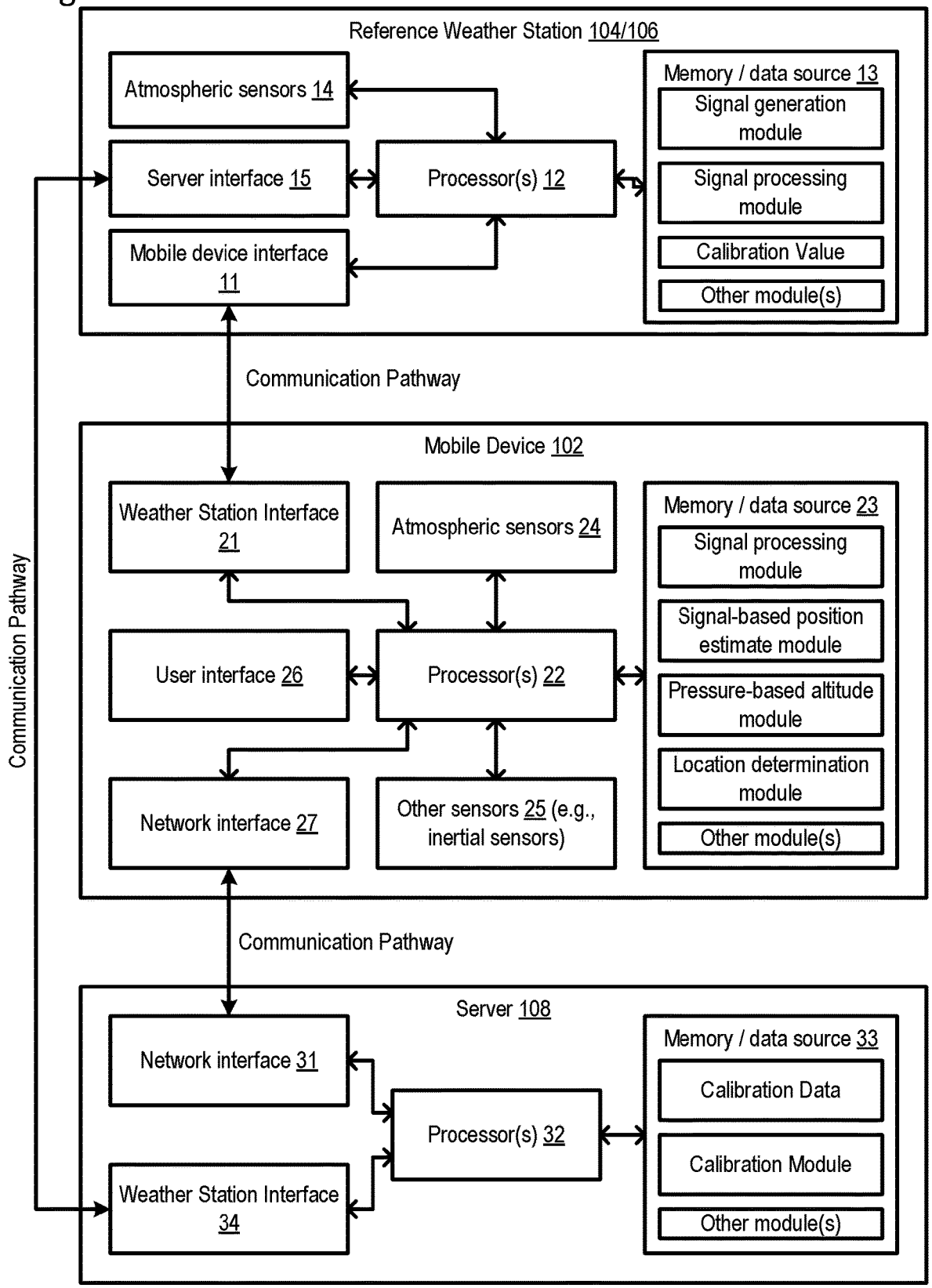
FIG. 8 shows simplified schematic diagrams of a reference weather station, a mobile device, and a server, in accordance with some embodiments.

Examples of possible hardware, software and data components in the weather stations 104 and 106, the mobile device 102, and the server 108 are shown in FIGS. 1 and 8, as described herein. In particular, each weather station 104 and 106 and mobile device 102 may include appropriate atmospheric sensors (e.g., barometric pressure sensors and temperature sensors) for generating measurements of atmospheric conditions (e.g., atmospheric pressure and temperature) that are used to calibrate the barometric pressure sensors 112 of the less reliable reference weather stations 106, estimate the altitude of the mobile device 102, or to calibrate the barometric pressure sensor (not shown) in the mobile device 102.

Figure 3:
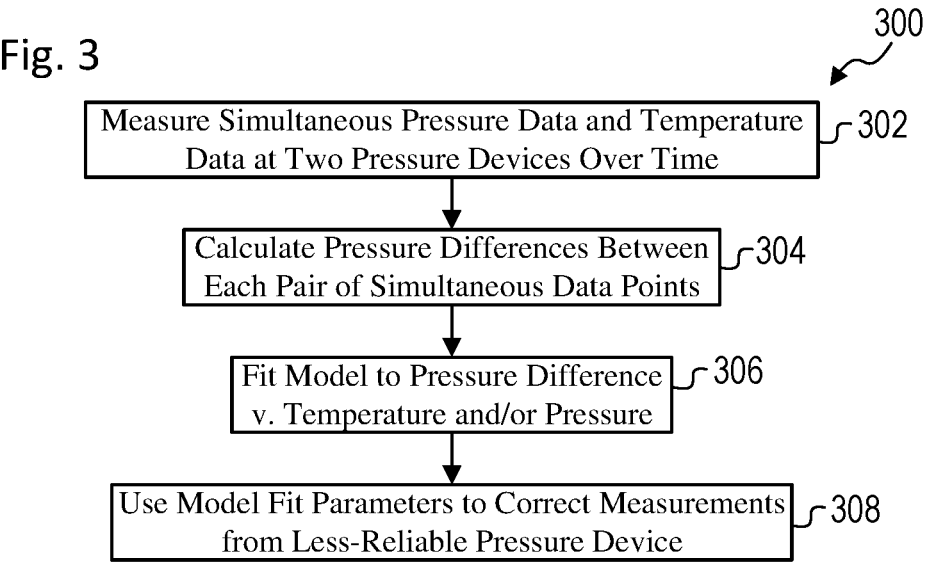
FIG. 3 is a simplified flowchart for a process for calibrating a pressure device across temperatures or pressures, in accordance with some embodiments.

An example process 300 for the server 108 (or one or more processors of the server 108) to calibrate a pressure device (e.g., the barometric pressure sensors 112 of the less reliable reference weather stations 106) across temperatures or pressures is shown in FIG. 3. The particular steps, combination of steps, and order of the steps for the process 300 are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps.

At 302, in some embodiments, pressure data and temperature data are measured and collected simultaneously at two spatially separated pressure devices (e.g., a high-quality or golden reference pressure device of the high-quality reference weather station 104 and a less reliable or drifty pressure device of a less reliable reference weather station 106) for several time points over T amount of time. (For embodiments that perform calibration across pressures, the temperature data might not be needed.) Time T can be several days to several weeks but should be less than the expected time of the drift of the sensor of the less reliable pressure device and may be evenly or unevenly spaced.

At 304, pressure differences are calculated between each pair of simultaneous data points of the collected pressure data for the high-quality reference pressure device and the less reliable pressure device. Since pressure varies with altitude, before calculating the differences, the pressure data of the two devices can be translated to a common altitude or plane, e.g., sea-level, 0 m Height Above Ellipsoid (HAE), an altitude close to the terrain in the area of the two devices, an altitude of one of the devices, etc.

At 306, the pressure differences calculated at 304 are associated with temperatures or pressures or both based on the temperature data and/or pressure data that correspond to the pairs of simultaneous data points used to calculate each pressure difference, and a model is fitted with temperatures and/or pressures as inputs and pressure differences as outputs, such that the model approximates the pressure differences when given the temperatures and/or pressures. The temperatures and/or pressures associated with the calculated pressure differences for use in fitting the model can be the temperatures and/or pressures measured by the less reliable pressure device for the simultaneous data points, the temperatures and/or pressures measured by the high-quality reference pressure device for the simultaneous data points, or some weighted combination of the two. The model can be chosen to closely match the expected temperature and/or pressure sensitivity of the less reliable pressure device. For example, a linear model can be chosen if the expected temperature and/or pressure sensitivity does not change significantly. Alternatively, a second-degree polynomial model can be chosen. It is undesirable to use models that have poor extrapolation features, such that if it is necessary to extrapolate a few degrees outside the range of the inputs used to generate the model, then there will not be a significant change in the pressure difference obtained from the model. Such undesirable models include polynomials with high orders ($3^{rd}$ or higher, for example), or exponential models.

Figure 4:
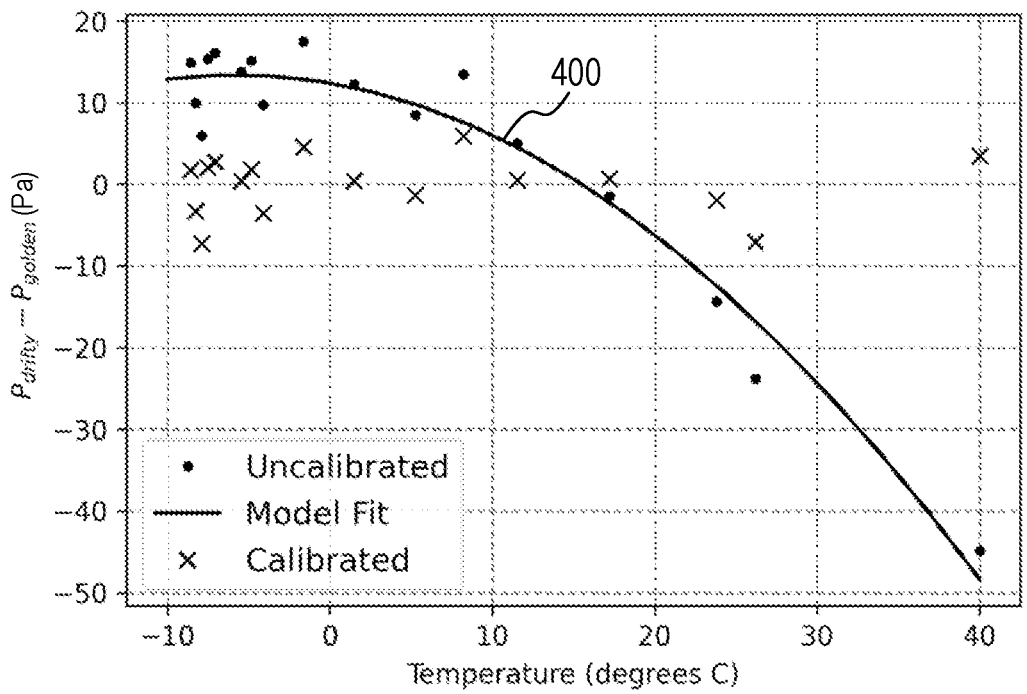
FIG. 4 shows example plots of pressure differences versus temperatures for use in the process shown in FIG. 3, in accordance with some embodiments.

FIG. 4 shows an example plot of the pressure differences versus temperatures for the uncalibrated data (the dots), the calibrated data (the Xs), and the model fitted to the uncalibrated data (the solid line plot 400). (For embodiments that perform calibration across pressures, an example plot would be of the pressure differences versus pressures.) "$P_{drifty}$" is the pressure measured by the less reliable pressure device, "$P_{golden}$" is the pressure measured by the high-quality reference pressure device, and "$P_{drifty}-P_{golden}$" is the pressure difference between the two. The curve of the solid line of the model, therefore, generally follows the dots of the uncalibrated data. In this example, the fit of the curve is to a second order polynomial, and there is a nonuniform density of data points (e.g., more dense at about −10 C and less dense at about 30-40 C). Additionally, in some embodiments, the raw data points can be used or sampled/binned data points can be used. After the pressure data is calibrated relative to the temperature, the Xs of the calibrated data have the same relative variance from the zero value of the pressure difference that the dots of the uncalibrated data have from the solid line of the model. In this manner, FIG. 4 illustrates that calibration using the model produces pressure results for the less reliable pressure device that closely match the measured pressure of the high-quality reference pressure device, e.g., less than +/−10 Pa in this example.

At 308 of the process 300 (FIG. 3), the model fit parameters are used to correct the pressure measurements from the less reliable pressure device going forward, i.e., the model fit parameters are the calibration value for the less reliable pressure device. The temperature or pressure used by the less reliable pressure device to determine the calibration value from the model can be its own measured temperature or pressure, the temperature or pressure simultaneously measured by the high-quality reference pressure device, or some weighted combination of the two.

The process 300 can be repeated periodically to adjust the model.

Figure 5:
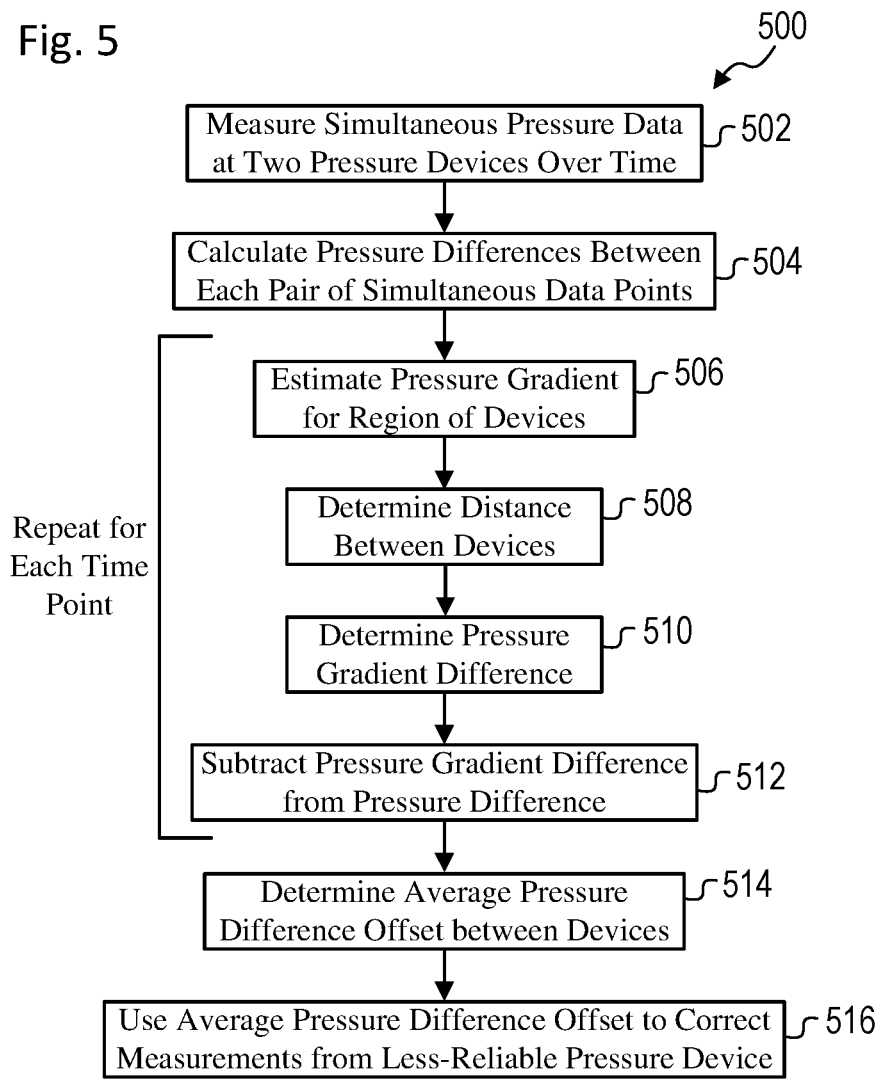
FIG. 5 is a simplified flowchart for a process for calibrating a pressure device using pressure gradient information, in accordance with some embodiments.

An example process 500 for the server 108 (or one or more processors of the server 108) to calibrate a less reliable pressure device (e.g., of the less reliable reference weather station 106) using pressure gradient information is shown in FIG. 5. The particular steps, combination of steps, and order of the steps for the process 500 are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps.

At 502, pressure data is measured and collected simultaneously at two spatially separated pressure devices (e.g., a high-quality reference pressure device of the high-quality reference weather station 104 and a less reliable pressure device of the less reliable reference weather station 106) for several (uniform or nonuniform) time points over T amount of time. Time T can be several days to several weeks but should be less than the expected time of the drift of the sensor of the less reliable pressure device.

At 504, the pressure differences are calculated between each pair of simultaneous data points of the collected pressure data for the high-quality reference pressure device and the less reliable pressure device. Since pressure varies with altitude, before calculating the pressure differences, the pressure data of the two devices can be translated to a common altitude or plane, e.g., sea-level, 0 m Height Above Ellipsoid (HAE), an altitude close to the terrain in the area of the two devices, an altitude of one of the devices, etc.

For each time point at which pressure data is simultaneously collected, the process 500 repeats 506-512. At 506, the pressure gradient dp/ds is estimated for a region that encompasses the two pressure devices. This can be derived from NOAA, another source of weather gradient mapping, through a lookup table, or interpolated from a gradient map. If a gradient map is unavailable for the timestamp of the pressures, then the gradient can be used from the closest available timestamp gradient map, or some interpolated gradient between maps that begin before the pressure timestamp and end after the pressure timestamp.

Figure 6:
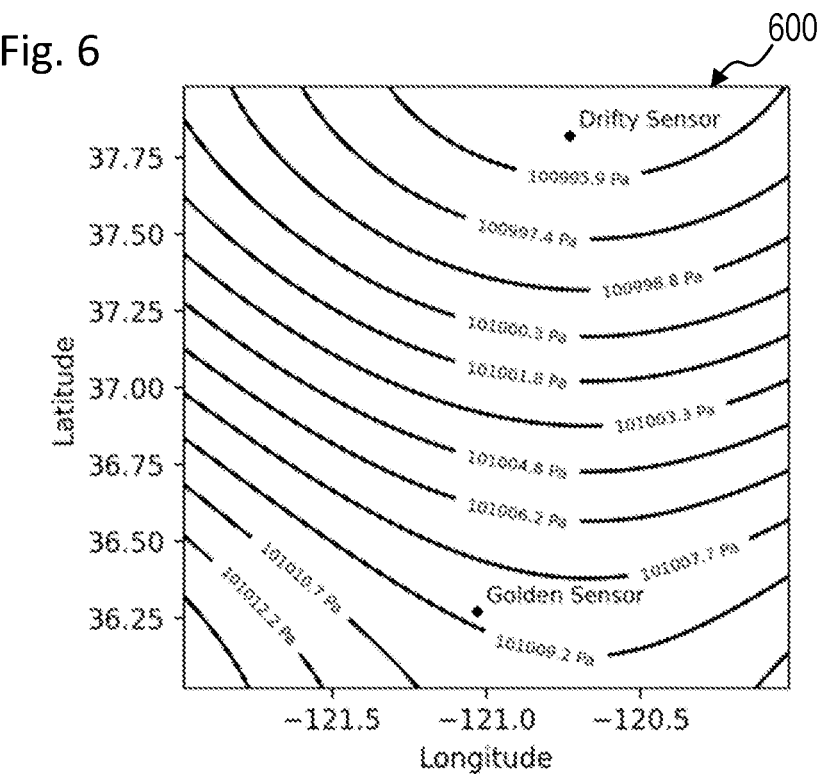
FIG. 6 shows an example of a pressure gradient map for use with the process shown in FIG. 5, in accordance with some embodiments.

FIG. 6 shows an example of a pressure gradient map 600 that can be used for this purpose, wherein a "drifty sensor" is the less reliable pressure device and a "golden sensor" is the high-quality reference pressure device. At 508, the distance between the two pressure devices is determined, measured, or calculated. At 510, a pressure gradient difference (i.e., the pressure difference between the two devices that is due to the pressure gradient) is determined based on the pressure gradient and the distance between the two pressure devices, e.g., by multiplying the pressure gradient by the distance between the two devices. At 512, the pressure gradient difference is subtracted from each of the pressure differences calculated at 504 to obtain pressure difference offsets for each pair of simultaneous data points.

At 514, an average pressure difference offset between the two devices is determined by averaging the pressure difference offsets for the pairs of simultaneous data points. At 516, the average pressure difference offset is used to correct the pressure measurements from the less reliable pressure device in addition to the calibration going forward.

Figure 7:
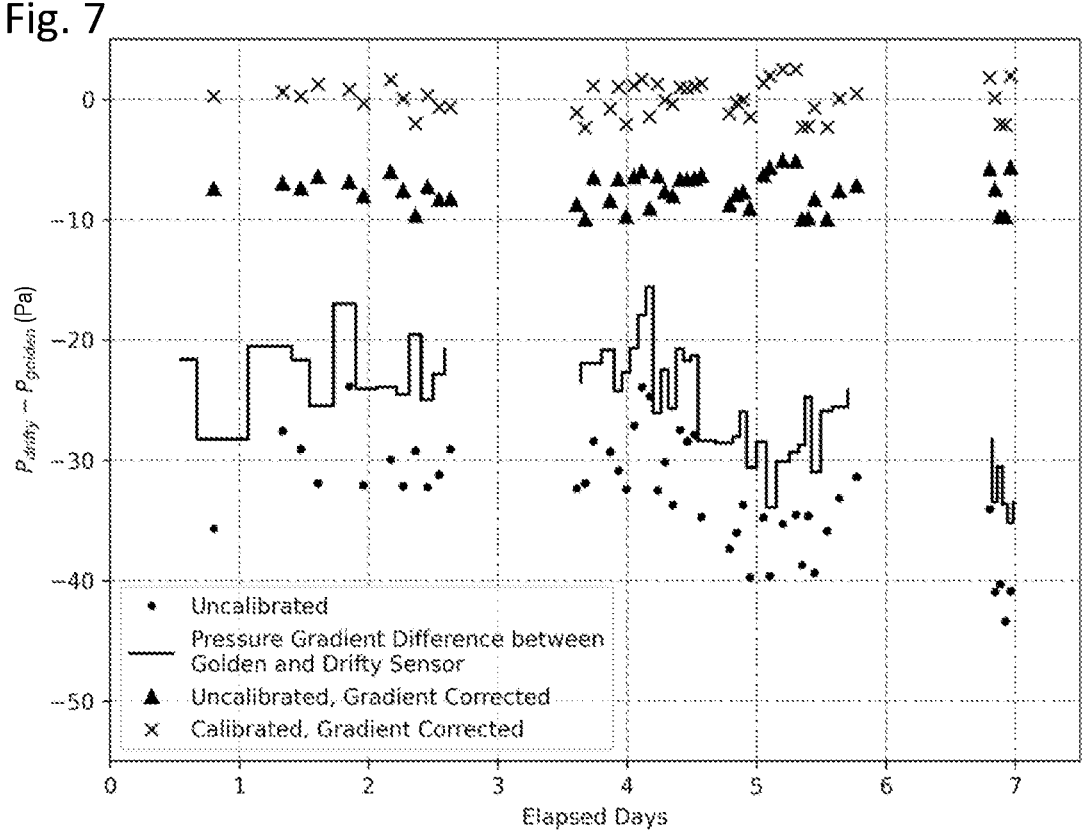
FIG. 7 shows example plots of pressure differences versus temperatures for use in the process shown in FIG. 5, in accordance with some embodiments.

FIG. 7 shows example plots of the pressure differences versus elapsed days (e.g., for a number of days that data is collected) for the uncalibrated data (the dots), the pressure gradient differences (the solid line) between the less reliable pressure device ("drifty sensor") and the high-quality reference pressure device ("golden sensor"), the uncalibrated gradient-corrected data (the triangles), and the calibrated and gradient-corrected data (the Xs). "$P_{drifty}$" is the pressure measured by the less reliable pressure device, "$P_{golden}$" is the pressure measured by the high-quality reference pressure device, and "$P_{drifty}-P_{golden}$" (or "$P_{golden}-P_{drifty}$") is the pressure difference between the two. The triangles of the uncalibrated gradient-corrected data have the same relative variance from the zero value of the pressure difference that the dots of the uncalibrated data have from the solid line of the pressure gradient differences, but offset from zero by a calibration value. In this example, there is a nonuniform density of data points and gaps in the data. After the pressure data is both calibrated and gradient-corrected, the Xs of the calibrated and gradient-corrected data have the same relative variance from the zero value of the pressure difference that the dots of the uncalibrated data have from the solid line of the pressure gradient differences. In this manner, FIG. 7 illustrates that calibration using the pressure gradient information between the two devices produces pressure results for the less reliable pressure device that closely match the measured pressure of the high-quality reference pressure device, e.g., less than +/−3 Pa in this example.

The process 500 can be repeated periodically to adjust the pressure gradient differences and the average pressure difference offset.

By way of example in FIG. 8, the reference weather stations 104 and 106 discussed herein may include: a mobile device interface 11 for exchanging information with a mobile device 102 (e.g., antenna(s) and RF front end components known in the art or otherwise disclosed herein) via the network 110; one or more processor(s) 12; memory/data source 13 for providing storage and retrieval of information and/or program instructions; atmospheric sensor(s) 14 for measuring environmental conditions (e.g., pressure, temperature, humidity, other) at or near the reference weather stations 104 and 106; a server interface 15 for exchanging information with a server 108 (e.g., an antenna, a network interface, or other) via the network 110; and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the reference weather stations 104 and 106; (ii) generation of calibration values for the reference weather stations 106 in the field; (iii) generation of positioning signals for transmission using a selected time, frequency, code, and/or phase; (iv) processing of signaling received from the mobile device 102 or other source; or (v) other processing as required by operations described in this disclosure. For example, the memory/data source 13 may include a signal generation module, a signal processing module, a calibration value, and other modules. Signals generated and transmitted by the reference weather stations 104 and 106 may carry different information that, once determined by the mobile device 102 or the server 108, may identify the following: the reference weather station 104 or 106; the weather station's position; environmental conditions (e.g., pressure and/or temperature) at or near the weather station 104 or 106; and/or other information known in the art. The atmospheric sensor(s) 14 may be integral with the reference weather stations 104 and 106, or separate from the reference weather stations 104 and 106 and either co-located with the reference weather stations 104 and 106 or located in the vicinity of the reference weather stations 104 and 106 (e.g., within a threshold amount of distance).

By way of example in FIG. 8, the mobile device 102 may include a network interface 27 for exchanging information with the server 108 via the network 110 (e.g., a wired and/or a wireless interface port, an antenna and RF front end components known in the art or otherwise disclosed herein); a weather station interface 21 for exchanging information with the reference weather stations 104 and 106 via the network 110; one or more processor(s) 22; memory/data source 23 for providing storage and retrieval of information and/or program instructions; atmospheric sensor(s) 24 (including a barometric pressure sensor) for measuring environmental conditions (e.g., pressure, temperature, other) at the mobile device 102; other sensor(s) 25 for measuring other conditions (e.g., compass, accelerometer and inertial sensors for measuring movement and orientation); a user interface 26 (e.g., display, keyboard, microphone, speaker, other) for permitting the user of the mobile device 102 to provide inputs and receive outputs; and any other components known to one of ordinary skill in the art. A GNSS interface and processing unit (not shown) are contemplated, which may be integrated with other components or a stand-alone antenna, RF front end, and processors dedicated to receiving and processing GNSS signaling. The memory/data source 23 may include memory storing data and software modules with executable instructions, including a signal processing module, a signal-based position estimate module, a pressure-based altitude module, a location determination module, a movement determination module (not shown), the current calibration value (not shown), the data packet (not shown), a calibration module (not shown), and other modules. The processor(s) 22 may perform different actions by executing the instructions from the modules, including: (i) performance of part or all of the methods, processes and techniques as described herein or otherwise understood by one of ordinary skill in the art as being performable at the mobile device 102; (ii) estimation of an altitude of the mobile device 102 (based on measurements of pressure from the mobile device 102 and the reference weather stations 104 and 106, temperature measurement(s) from the reference weather stations 104 and 106 or another source, and any other information needed for the computation); (iii) processing of received signals to determine position information or location data (e.g., times of arrival or travel time of the signals, pseudoranges between the mobile device 102 and the reference weather stations 104 and 106, weather station atmospheric conditions, weather station and/or locations or other weather station information); (iv) use of position information to compute an estimated position of the mobile device 102; (v) determination of movement based on measurements from inertial sensors of the mobile device 102; (vi) GNSS signal processing; (vii) storing the current calibration value; (viii) calibrating its barometric pressure sensor; and/or (ix) other processing as required by operations described in this disclosure.

By way of example in FIG. 8, the server 108 may include: a network interface 31 for exchanging information with the mobile device 102 and other sources of data via the network 110 (e.g., a wired and/or a wireless interface port, an antenna, or other); one or more processor(s) 32; memory/data source 33 for providing storage and retrieval of information and/or program instructions; a weather station interface 34 for exchanging information with the reference weather stations 104 and 106 (e.g., a wired and/or a wireless interface port, an antenna, or other); and any other components known to one of ordinary skill in the art. The memory/data source 33 may include memory storing data and software modules with executable instructions, such as a calibration module and calibration data (e.g., the data 118-128) for generating the calibration values 130 for the less reliable reference weather stations 106 for use in calibrating the barometric pressure sensors 112 of the less reliable reference weather stations 106, a general calibration data assembly module (not shown), calibration technique modules (not shown), a signal-based positioning module (not shown), a pressure-based altitude module (not shown), a calibration conduciveness module (not shown), as well as other modules for each of the above-described methods and processes or portions/steps thereof. The processor(s) 32 may perform different actions by executing instructions from the modules, including: (i) performance of part or all of the methods, processes and techniques as described herein or otherwise understood by one of ordinary skill in the art as being performable at the server 108; (ii) estimation of the calibration values 130 for the less reliable reference weather stations 106; (iii) estimation of an altitude of the mobile device 102; (iv) computation of an estimated position of the mobile device 102; (v) performance of calibration techniques; (vi) calibration of the mobile device 102; or (vii) other processing as required by operations or processes described in this disclosure. Steps performed by servers 108 as described herein may also be performed on other machines that are remote from the reference weather stations 104/106 and the mobile device 102, including computers of enterprises or any other suitable machine.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
    collecting, by a processor, simultaneous pressure data at a first reference weather station and a second reference weather station for multiple time points, wherein the first reference weather station and the second reference weather station have been deployed in an operational environment, and the first reference weather station has a higher reliability and is less prone to sensor drift relative to the second reference weather station;
    calculating, by the processor, pressure differences between pairs of simultaneous data points of the collected pressure data;
    for each time point, estimating, by the processor, a pressure gradient for a region that encompasses the first reference weather station and the second reference weather station;
    determining, by the processor, a distance between the first reference weather station and the second reference weather station;
    for each time point, determining, by the processor, a pressure gradient difference between the first reference weather station and the second reference weather station based on the pressure gradient and the distance between the first reference weather station and the second reference weather station;
    for each time point, obtaining, by the processor, a pressure difference offset for one of the data points of the pair of simultaneous data points based on the pressure gradient difference and the pressure difference;
    determining, by the processor, an average pressure difference offset between the first reference weather station and the second reference weather station by averaging the pressure difference offsets for the pairs of simultaneous data points; and
    calibrating, by the processor, the second reference weather station using the average pressure difference offset.

2. The method of claim 1, wherein determining the pressure gradient difference between the first reference weather station and the second reference weather station further comprises:
    multiplying the pressure gradient by the distance between the first reference weather station and the second reference weather station.

3. The method of claim 1, wherein obtaining the pressure difference offset for one of the data points of the pair of simultaneous data points further comprises:
    subtracting the pressure gradient difference from the pressure difference.

* * * * *